(12) United States Patent
Dobrowolski

(10) Patent No.: US 9,624,822 B2
(45) Date of Patent: Apr. 18, 2017

(54) RELIEF VALVE

(75) Inventor: Michael Dobrowolski, Markdorf (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 14/004,015

(22) PCT Filed: Mar. 8, 2012

(86) PCT No.: PCT/EP2012/001018
§ 371 (c)(1),
(2), (4) Date: Oct. 17, 2013

(87) PCT Pub. No.: WO2012/119770
PCT Pub. Date: Sep. 13, 2012

(65) Prior Publication Data
US 2014/0026560 A1    Jan. 30, 2014

(30) Foreign Application Priority Data
Mar. 9, 2011 (DE) .......... 10 2011 013 429

(51) Int. Cl.
| | | |
|---|---|---|
| F02B 37/18 | (2006.01) | |
| F15B 15/10 | (2006.01) | |
| F02B 39/00 | (2006.01) | |
| F04D 27/02 | (2006.01) | |

(52) U.S. Cl.
CPC .......... *F02B 37/183* (2013.01); *F02B 37/186* (2013.01); *F02B 39/00* (2013.01); *F04D 27/023* (2013.01); *F04D 27/0215* (2013.01); *F15B 15/10* (2013.01); *Y02T 10/144* (2013.01); *Y10T 137/6579* (2015.04)

(58) Field of Classification Search
CPC ...... F02B 37/18; F02B 37/183; F02B 37/186; Y02T 10/144
USPC .............................................. 60/602; 137/340
See application file for complete search history.

(56) References Cited

U.S. PATENT DOCUMENTS

| | | | | |
|---|---|---|---|---|
| 2,063,779 | A | * | 12/1936 | Baj ............................. 123/41.17 |
| 2,967,518 | A | * | 1/1961 | Zuhn ........................... 123/41.77 |
| 3,104,520 | A | * | 9/1963 | Cazier et al. ................... 60/602 |
| 3,270,951 | A | * | 9/1966 | Reed ............................... 60/602 |
| 4,075,849 | A | * | 2/1978 | Richardson ..................... 60/602 |
| 4,250,710 | A | | 2/1981 | Matsuoka et al. |
| 4,256,019 | A | * | 3/1981 | Braddick .......................... 92/94 |
| 4,418,535 | A | * | 12/1983 | Ecomard ......................... 60/602 |

(Continued)

FOREIGN PATENT DOCUMENTS

| | | |
|---|---|---|
| DE | 2657794 A | 6/1978 |
| DE | 3009453 C2 | 3/1984 |

(Continued)

*Primary Examiner* — Kevin Murphy
(74) *Attorney, Agent, or Firm* — Lucas & Mercanti, LLP; Klaus P. Stoffel

(57) ABSTRACT

A relief valve for turbines of exhaust turbochargers. Hot exhaust gas flows against this type of relief valves and the relief valves heat up significantly. Sensitive components such as the springs or the membrane can be damaged as a result. The relief valves are normally designed so that the membrane and a radiation panel are adjacent to a first chamber. Air is continuously guided through the first chamber in order to specifically cool the membrane and protect the membrane from excessive heating.

23 Claims, 4 Drawing Sheets

(56) References Cited

U.S. PATENT DOCUMENTS 4,630,445 A 12/1986 Parker
2010/0043429 A1 2/2010 Wolk et al.

FOREIGN PATENT DOCUMENTS

DE 3536804 A 4/1987
DE 3509019 C2 1/1991

* cited by examiner

RELIEF VALVE

The present application is a 371 of International application PCT/EP2012/001018, filed Mar. 8, 2012, which claims priority of DE 10 2011 013 429.8, filed Mar. 9, 2011, the priority of these applications is hereby claimed and these applications are incorporated herein by reference.

BACKGROUND OF THE INVENTION

The invention pertains to a relief valve for turbines of exhaust gas turbochargers.

An exhaust gas turbocharger for an internal combustion engine usually contains a turbine and a compressor. The turbine is usually driven by the exhaust gas of the internal combustion engine, and the rotor of the turbine is connected in some way to the rotor of the compressor, as a result of which the rotation of the turbine rotor causes the compressor rotor to rotate also. The compressor then delivers combustion air under pressure to the associated internal combustion engine. A problem with turbochargers of this type is that the rpm's of the turbine rotor and thus of the compressor rotor increase with the rpm's and/or load of the internal combustion engine. At high operating rpm's or loads of the internal combustion engine, it is possible for the turbine and the compressor to be driven at excessive rpm's. It is also possible for the compressor to supply combustion air to the engine at pressures which are higher that the maximum allowable pressures for the machine.

Devices which go into effect when the rotor speed or load exceeds a certain value have already been installed in exhaust gas turbochargers. These devices usually have a relief valve, which allows at least some of the engine exhaust gas to bypass the turbine when the rpm's or load of the engine reaches a predetermined value. A relief valve of this type is usually designed as a poppet valve with a valve stem guided in a valve housing. The valve is actuated by the force of a spring and/or by a diaphragm, which forms the boundary of a pressure chamber and is actuated by compressed air.

A problem which occurs with the use of poppet valves is that the valve spring is exposed to the very high exhaust gas temperatures of the engine exhaust gas and thus becomes extremely hot. The heat flows along the valve stem and causes the valve stem and the valve housing to overheat. The direct conduction of heat via the valve stem and also the thermal radiation from the valve housing, for example, can cause the spring and the diaphragm to overheat. This overheating can cause the following:

the failure of the diaphragm and a loss of stiffness of the spring, which leads to changes in the spring pretension and thus in the working point of the valve.

The prior art includes examples of how these problems are said to be prevented. Thus DE 30 09 453 C2 discloses a control device for the relief valves of exhaust gas turbochargers, in which the diaphragm is protected from thermal radiation by a radiation shield plate. This radiation shield plate is arranged in a space and divides this space into two chambers. A first chamber is bounded by the diaphragm and the shield plate, and a second chamber is bounded by the shield plate and the valve housing. Compressed air flows into the second chamber, flows around one side of the shield plate, and thus cools it. It then flows toward the valve disk along the valve stem through the gap formed between the valve stem and its guide in the valve housing, thus cooling the valve stem, and finally arrives in a space on the hot side, which is bounded by a hot-side radiation shield plate. From this hot-side space, the compressed air flows through a gap between the valve stem and the hot-side radiation shield plate and into the exhaust gas channel. The radiation shield plate protects the valve housing of the relief valve from the heat of the engine exhaust gas.

In this type of design for a control device for relief valves, the cooling effect on the diaphragm is not sufficient. The protection which the hot-side radiation shield plate provides from the hot engine exhaust gas in the exhaust gas channel is also low.

DE 35 09 019 C2 discloses a relief valve for a turbine of an exhaust gas turbocharger on an internal combustion engine. As also in the case of the above-cited DE 30 09 453 C2, a space in which a diaphragm is arranged is again provided, this space being divided by a radiation shield plate into a first chamber and a second chamber. Here, too, compressed air flows into the second chamber to cool the radiation shield plate from one side. The two chambers are connected to each other by an opening in the radiation shield plate. Here, too, the cooling effect leaves much to be desired.

SUMMARY OF THE INVENTION

The goal of the invention is to improve the cooling effect and thus to avoid the overheating of the diaphragm.

According to the invention, a relief valve is provided
with a valve disk cooperating with a valve seat and
with a valve stem guided in a valve housing,
wherein a space, in which a diaphragm connected to the valve stem is arranged, is provided in the valve housing;
wherein the diaphragm is connected around its outer periphery with a sealing effect to the valve housing;
wherein a radiation shield plate, which is located in the space on the side of the diaphragm facing the valve disk and a certain distance away from the diaphragm, extends around the valve stem, this shield plate dividing the space into two chambers, namely, a first chamber bounded by the diaphragm and the radiation shield plate, and a second chamber, bounded by the radiation shield plate and a wall of the valve housing;
wherein, in the area of the chambers, the valve housing is designed with at least one air inlet on an outer periphery for supplying air;
wherein at least some of the air entering through the air inlet flows through in the guide along the valve stem toward the valve disk; and
wherein the radiation shield plate comprises openings allowing the passage of air.

The air flows continuously through the first chamber formed by the diaphragm and the radiation shield plate.

The inventive relief valve advantageously allows the air to flow directly and continuously around the diaphragm, thus cooling it, so that heat which might damage the diaphragm is prevented from building up in the first chamber.

According to a preferred embodiment of the invention, the first chamber is designed with the air inlet. The advantage here is that cool air flows directly into the first chamber and that the air inlet or the air inlets can be designed in such a way that the air flows around the diaphragm in optimal fashion.

According to another preferred embodiment of the invention, the first chamber is designed with the air inlet and at least some of the air flowing out of the first chamber flows into the second chamber. The advantage here is that cool air flows directly into the first chamber and that the air inlet or the air inlets can be designed in such a way that the air flows around the diaphragm in optimal fashion. Some of the outflowing air flows through the second chamber and prevents heat from accumulating there. As a result, the diaphragm is cooled even more effectively.

According to another preferred embodiment of the invention, the second chamber is designed with the air inlet, and the air flowing out of the second chamber flows into the first chamber. The advantage here is that the air flowing into the first chamber can be directed straight at the diaphragm to ensure good cooling. In addition, the conventional design of a relief valve can be retained, which is favorable in terms of cost.

According to another preferred embodiment of the invention, the air inlet opens out into a ring-shaped channel, which is open to the second chamber. The advantage here is that the air can flow uniformly into the second chamber.

According to another preferred embodiment of the invention, the air inlet is shared equally between the first and second chambers, and the air flows continuously through at least the first chamber. The advantage here is that cool air flows into both chambers, flows around and cools the diaphragm on one side, and also prevents heat from accumulating in the second chamber on the other side. Overall, a good cooling effect is obtained for the diaphragm.

According to another preferred embodiment of the invention, the air flowing out of the first chamber proceeds by way of a ring-shaped gap between the valve stem and the radiation shield plate. The first advantage here is that the flow through the first chamber is oriented in a single direction, and the second advantage is that the hot valve stem is cooled by the air in concentrated fashion, which improves the overall cooling effect.

According to another preferred embodiment of the invention, the outer periphery of the radiation shield plate is connected with a sealing effect to the valve housing. The advantage here is that the relief valve of the conventional design can be retained.

According to another preferred embodiment of the invention, a ring-shaped gap is present between the outer periphery of the radiation shield plate and the valve housing. The advantage here is that the direction of the air flow around the diaphragm can be optimized; the air can, for example, flow from the outside toward the inside.

According to another preferred embodiment of the invention, several openings, distributed uniformly on a radius, are provided in the radiation shield plate. The advantage here is that the air flows into the first chamber with a high degree of uniformity.

According to another preferred embodiment of the invention, several openings are provided in the radiation shield plate to ensure a uniform air flow, these openings being arranged in such a way that the cross-sectional area of the openings on the side facing the air inlet is smaller than that of the openings on the side facing away from the air inlet. The advantage here is that the air flow can be optimally adjusted.

According to another preferred embodiment of the invention, the openings in the radiation shield plate are all of equal size. The advantage here is that, when the shield plate is installed, there is no need to make sure that the openings are in any special position.

According to another preferred embodiment of the invention, the openings in the radiation shield plate are of different sizes. The advantage here is that this makes it possible to adjust the air flow to ensure optimal cooling of the diaphragm.

According to another preferred embodiment of the invention, the openings are arranged near the outer periphery of the radiation shield plate. The advantage here is that the air is directed toward the entire surface of the diaphragm and thus cools it in optimal fashion.

According to another preferred embodiment of the invention, the radiation shield plate is designed with a web, which points toward the valve disk and rests against the opposite wall of the valve housing. The advantage here is that the radiation shield plate is positioned a certain distance away from the valve housing wall in a vibration-free manner.

According to another preferred embodiment of the invention, the web is designed in the form of a ring-shaped pleat, which extends around the valve stem and fits into and rests against a ring-shaped groove in the valve housing. The advantage here is that the pleat holds the radiation shield plate in position in the valve housing and also centers it.

According to another preferred embodiment of the invention, the web comprises at least one opening in its periphery. The advantage here is that air can flow out of the second chamber.

According to another preferred embodiment of the invention, the web comprises several openings uniformly distributed around its periphery. The advantage here is that the air can flow radially out of the second chamber in all directions.

According to another preferred embodiment of the invention, the web comprises several openings in its periphery which are at different distances from each other. The advantage here is that this makes it possible to configure the optimal air flow in the second chamber.

According to another preferred embodiment of the invention, the openings in the web are all of equal size. The advantage here is that these are easy to fabricate industrially.

According to another preferred embodiment of the invention, the openings in the web are of different sizes. The advantage here is that this makes it possible to configure the optimal air flow in the second chamber.

According to another preferred embodiment of the invention, the air flowing out of the gap between the guide and the valve stem flows into a space on the hot side, which is bounded by a valve housing wall lying on the downstream side and a hot-side radiation shield plate extending around the valve stem, wherein the outer periphery of the hot-side radiation shield plate is connected with a sealing effect to the valve housing wall, and that the hot-side radiation shield plate has air outlets in the area of its outer periphery. The advantage here is that air can flow radially through the hot-side space, and no heat will accumulate in the hot-side space, i.e., heat which could flow from there via the valve housing to the diaphragm and damage it.

According to another preferred embodiment of the invention, a gap is formed between the hot-side radiation shield plate and the valve stem, which gap represents another air outlet. The advantage here is that the air can also flow out along the valve stem and thus cool even the hot end of this shaft.

Exemplary embodiments of the invention are illustrated in the drawing and are described in greater detail below.

DETAILED DESCRIPTION OF THE INVENTION

Figure 1:
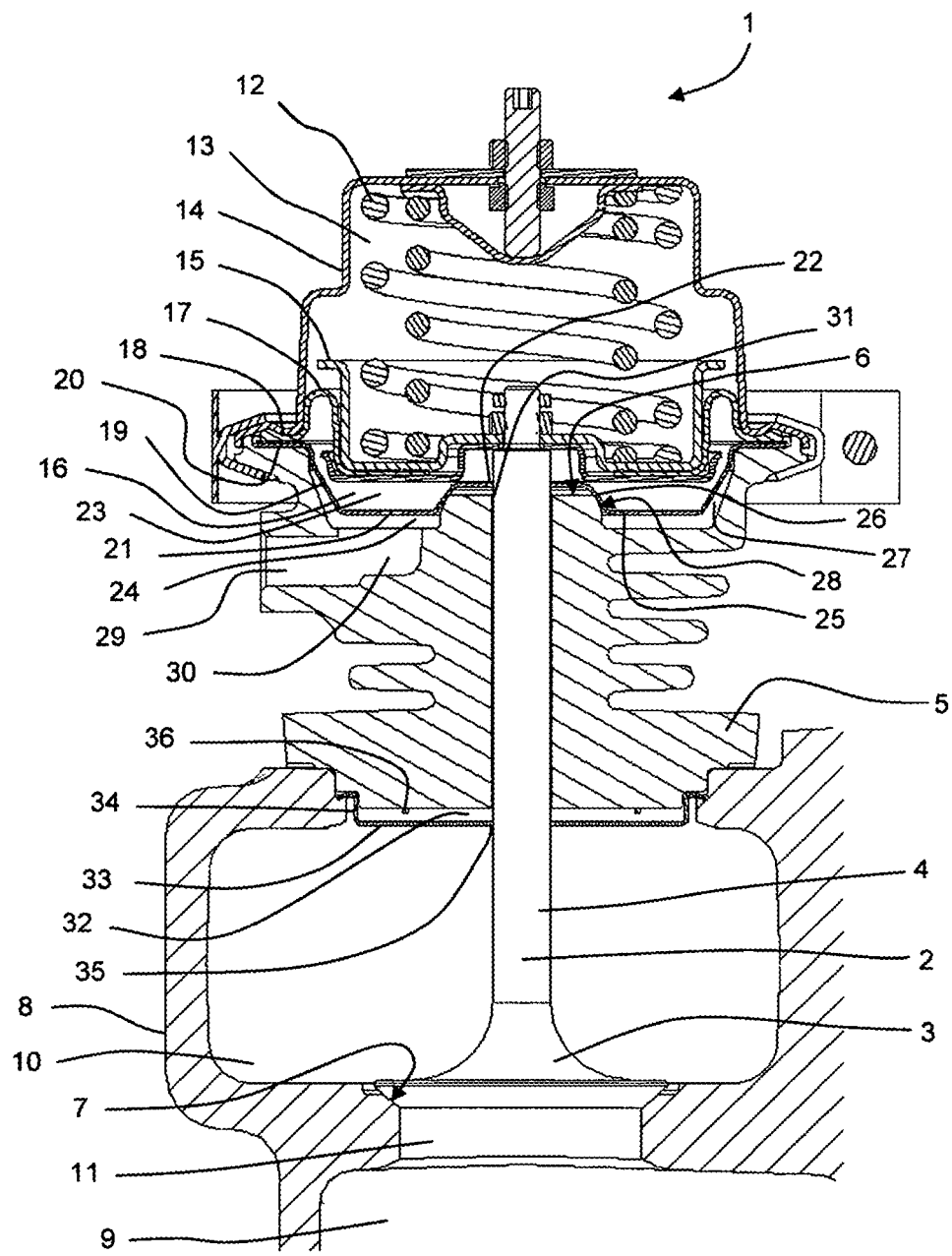
FIG. 1 shows a cross section through the relief valve according to a first embodiment of the invention.

FIG. 1 shows the essential components of a relief valve 1 according to a first embodiment for blowing off exhaust gas upstream of a turbine (not shown) of an exhaust gas turbocharger (not shown). A valve element 2, consisting of a valve disk 3 and a valve stem 4, is guided by its valve stem 4 in a valve housing 5. The valve housing 5 is mounted on an exhaust gas housing 8, in which an exhaust gas channel 9 and a blow-off channel 10 are integrated. The blow-off channel 9 and the relief channel 10 are connected to each other by an overflow opening 11, into which a valve seat 7 is machined. The valve disk 3 cooperates with the valve seat 7 in the overflow opening 11. At least one spring 12, installed in a spring chamber 13 of the relief valve 1, is tensioned between a cover 14 of the relief valve 1 and a holder 15 for a diaphragm 17. Because the holder 15 is connected to the valve stem 4, the force of the spring is transmitted to the valve element 2. In the nonactuated state of the relief valve 1, the spring force causes the valve disk 3 to remain in a closed position in the valve seat 7 and thus separates the exhaust gas channel 9 from the relief channel 10. As a result, all of the exhaust gas flows into the turbine of the exhaust gas turbocharger. Only when the valve element 2 is opened does some of the exhaust gas flow via the overflow opening 11 into the relief channel 10, thus bypassing the turbine. In the valve housing 5, a space 16 is provided, in which the diaphragm 17 is arranged; the diaphragm is connected to the valve stem 4, and its outer periphery 18 is connected with a sealing effect to the valve housing 5. The space 16 is divided by a radiation shield plate 19 into a first chamber 23 and a second chamber 24. The radiation shield plate 19 is arranged opposite one of the walls 6 of the valve housing, extends around the valve stem 4, and is connected by its outer periphery 20 with a sealing effect to the valve housing 5. In addition, the radiation shield plate 19 has a ring-shaped pleat 25, which points toward the valve disk 3 and extends around the valve stem 4. A pleat wall 26 of the pleat 25 pointing toward the valve stem 4 projects into a ring-shaped groove 27 in the valve housing wall 6 and thus rests against one of the walls 28 of the ring-shaped groove 27 in such a way that the radiation shield plate 19 is centered and held in position. Openings 21 arranged near the outer periphery 20 of the radiation shield plate 19 allow air to pass through, as the ring-shaped groove 22 located between the radiation shield plate 19 and the valve stem 4 also does. The radiation shield plate 19 serves to protect the diaphragm 17 from damaging thermal radiation emanating from the hot valve housing 5 and the valve stem 4. The thermal protection provided by the radiation shield plate 19 alone, however, is not sufficient to protect the diaphragm 17 from damage. For further thermal protection, a supplemental measure in the form of the air cooling of the diaphragm 17 is necessary. For this purpose, air flows via an air inlet 29 in the valve housing 5 into a ring-shaped channel 30 and from there into the second chamber 24. The second chamber 24 is bounded on one side by the radiation shield plate 19. The air flowing into the second chamber 24 flows through the openings 21 in the radiation shield plate 19 and then into the first chamber 23. There the air flows around and cools the diaphragm 17 directly from one side, before leaving the first chamber 23 through the ring-shaped gap 22 between the radiation shield plate 19 and the valve stem 4 and entering a gap 31 between the valve stem 4 and the valve housing 5. From this gap 31, the air flows into a hot-side space 32, which is bounded by the valve housing 5 and a hot-side radiation shield plate 33, which rests on the valve housing 5. The hot-side radiation shield plate 33 protects the relief valve 1 from direct contact with the hot exhaust gas in the relief channel 10. As the air flows through the hot-side space 32, it thus cools the hot-side radiation shield plate 33 and the valve housing 5. After leaving the hot-side space 32, the air enters the relief channel 10 through a ring-shaped gap 35 between the hot-side radiation shield plate 33 and the valve stem 5 and also through the air outlets 36 in the outer periphery 34 of the hot-side radiation shield plate 33.

Figure 2:
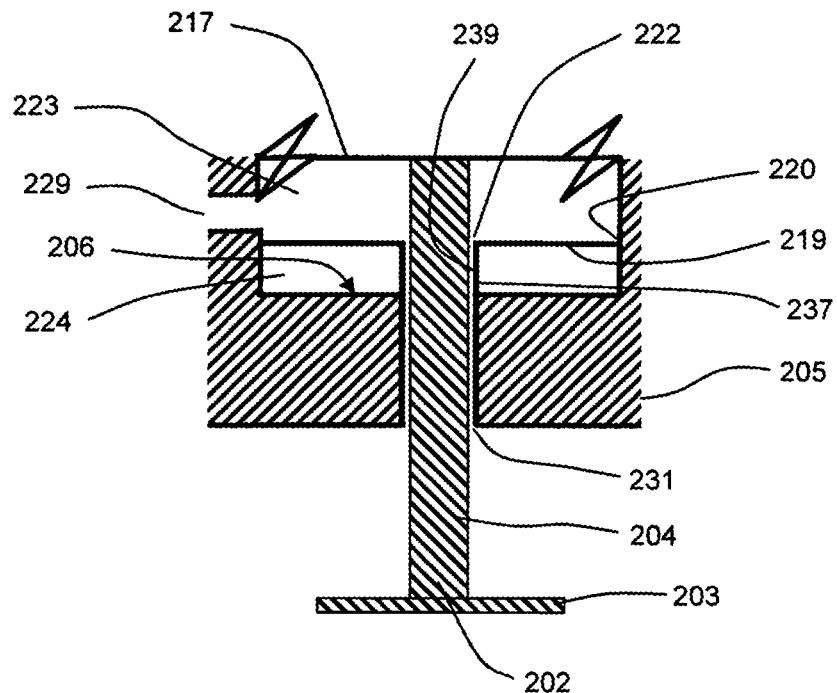
FIG. 2 shows a schematic cross-sectional view of the diaphragm area of a relief valve according to another embodiment.

FIG. 2 shows a schematic cross-sectional view of the diaphragm area of a relief valve according to a second embodiment. The air inlet 229 opens out here directly into a first chamber 223, which is formed by the diaphragm 217 and the radiation shield plate 219. The radiation shield plate 219 is connected around its outer periphery 220 with a sealing effect to the valve housing 205 and is designed with a web 237, which surrounds the valve stem 204 of the valve element 202 in ring-like fashion and rests against the valve housing wall 206 opposite the radiation shield plate 219. As a result, the second chamber 224 is formed. The air flowing through the air inlet 229 into the first chamber 223 flows around and cools the diaphragm 217 and the radiation shield plate 219 on one side, before flowing out of the first chamber 223 through the ring-shaped gap 222 between the radiation shield plate 219 and the valve stem 204. After entering the ring-shaped gap 222, the air flows toward the valve disk 203 along the gap 239 between the web 237 and the valve stem 204 and through the gap 231 between the valve stem 204 and the valve housing 205. The further course of the air flow is the same as that described in association with FIG. 1.

Figure 3:
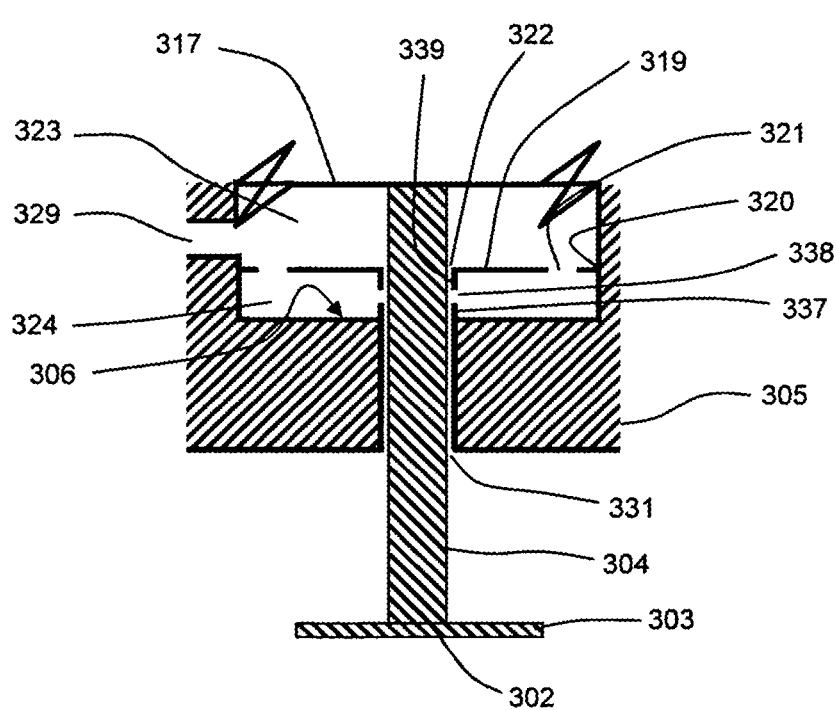
FIG. 3 shows a schematic cross-sectional view of the diaphragm area of a relief valve according to another embodiment.

FIG. 3 shows a schematic cross-sectional view of the diaphragm area of a relief valve according to a third embodiment. The air inlet 329 opens out here directly into the first chamber 323, which is formed by the diaphragm 317 and the radiation shield plate 319. The radiation shield plate 319 is connected around its outer periphery 320 with a sealing effect to the valve housing 305 and is designed with a web 337, which surrounds the valve stem 304 of the valve element 302 in ring-like fashion and rests against the valve housing wall 306 opposite the radiation shield plate 319. As a result, the second chamber 324 is formed. The air flowing into the first chamber 323 through the air inlet 329 flows around and cools the diaphragm 317 and the radiation shield plate 319 on one side, before flowing out of the first chamber 323 through the ring-shaped gap 322 between the radiation shield plate 319 and the valve stem 304 and through the openings 321 in the radiation shield plate 319 close to its outer periphery 320. Some of the air therefore flows into the second chamber 324, cools the surrounding components, and flows through openings 338 in the web 337 into the gap 339 between the web 337 and the valve stem 304. At this point, this part of the air flow combines with the part which flows out of the first chamber 323 through the ring-shaped gap 322 between the radiation shield plate 319 and the valve stem 304. The combined air flow now flows toward the valve disk 303 through the gap 331 between the valve stem 304 and the valve housing 305. The further course of the air flow is the same as that described in association with FIG. 1.

Figure 4:
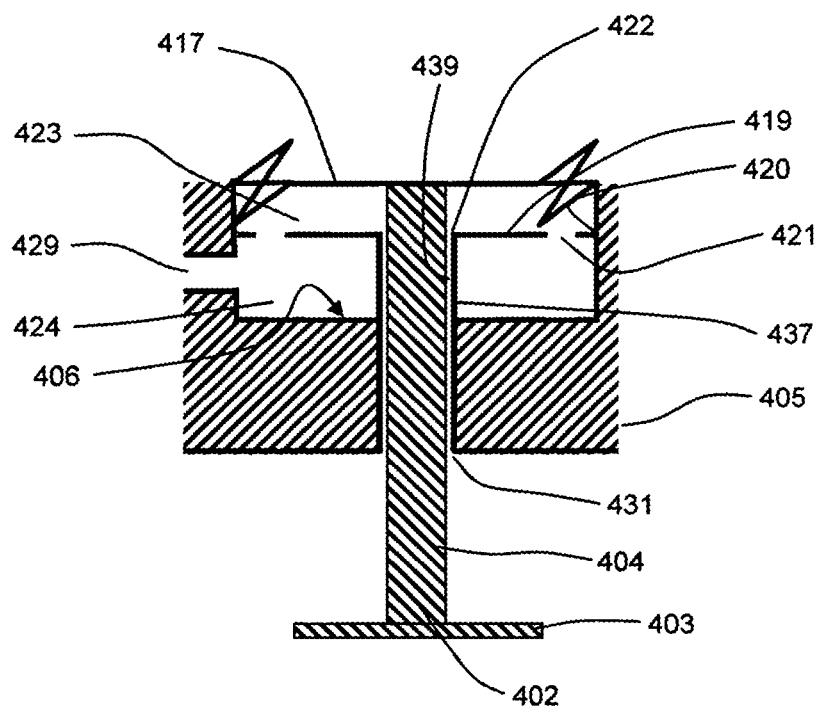
FIG. 4 shows a schematic cross-sectional view of the diaphragm area of a relief valve according to another embodiment.

FIG. 4 shows a schematic cross-sectional view of the diaphragm area of a relief valve according to a fourth embodiment. The diaphragm 417 and the radiation shield plate 419 together form the first chamber 423. The radiation shield plate 419 is connected around its outer periphery 420 with a sealing effect to the valve housing 405 and is designed with the web 437, which surrounds the valve stem 404 of the valve element 402 in ring-like fashion and rests against the valve housing wall 406 opposite the radiation shield plate 419. As a result, the second chamber 424 is formed. The air inlet 429 opens out into this second chamber 424. The air flowing through this air inlet 429 cools the surrounding components before flowing through the openings 421 in the radiation shield plate 419 close its outer periphery 420 and into the first chamber 423. There the air flows around and cools the diaphragm 417 and the radiation shield plate 419, before flowing out of the first chamber 423 via the ring-shaped gap 422 between the radiation shield plate 419 and the valve stem 404. After entering the ring-shaped gap 422, the air flows toward the valve disk 403 through the gap 439 between the web 437 and the valve stem 404 and through the gap 431 between the valve stem 404 and the valve housing 405. The further course of the air flow is the same as that described in association with FIG. 1.

Figure 5:
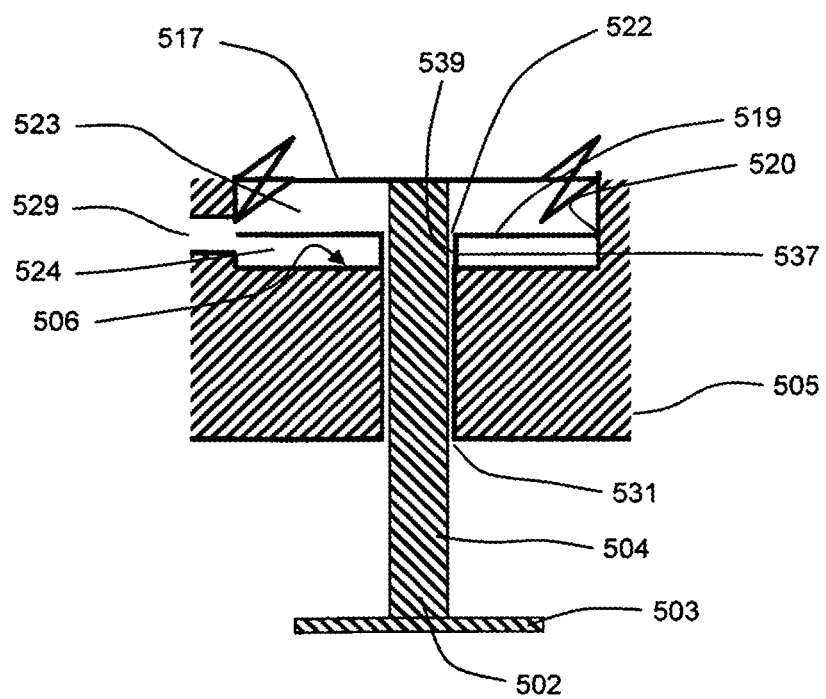
FIG. 5 shows a schematic cross-sectional view of the diaphragm area of a relief valve according to another embodiment.

FIG. 5 shows a schematic cross-sectional view of the diaphragm area of a relief valve according to a fifth embodiment. The diaphragm 517 and the radiation shield plate 519 together form the first chamber 523. The radiation shield plate 519 again cooperates with the opposite valve housing wall 506 to form the second chamber 524. The radiation shield plate 519 is connected around its outer periphery 520 with a sealing effect to the valve housing 505 except for an area which serves as an air inlet 529 for the two chambers 523 and 524. In addition, the radiation shield plate 519 is designed with the web 537, which surrounds the valve stem 504 of the valve element 502 in ring-like fashion and rests against the valve housing wall 506 opposite the radiation shield plate 519. The air flowing through the air inlet 529 flows around and cools the diaphragm 517 and the radiation shield plate 519 on one side in the first chamber 523 before flowing out of the first chamber 523 via the ring-shaped gap 522 between the radiation shield plate 519 and the valve stem 504. Although there is a continuous flow of air through the second chamber 524, the air flowing through the air inlet 529 into the first chamber 523 causes vortices and turbulence to form in the second chamber 524. These air movements ensure the cooling of the surrounding components of the second chamber 524. After the air flows out of the first chamber 523 through the ring-shaped gap 522, it flows toward the valve disk 503 through the gap 539 between the web 537 and the valve stem 504 and through the gap 531 between the valve stem 504 and the valve housing 505. The further course of the air flow is the same as that described in association with FIG. 1.

Figure 6:
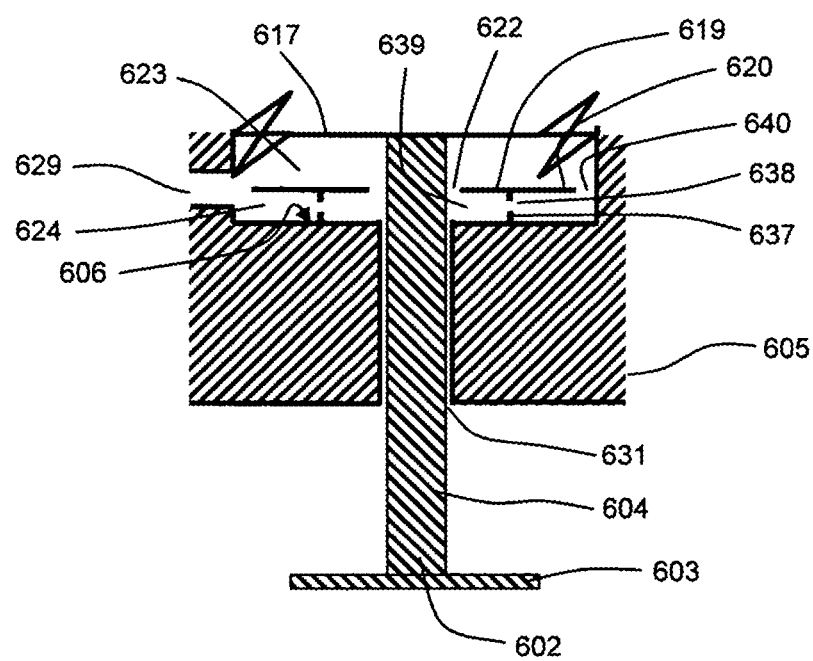
FIG. 6 shows a schematic cross-sectional view of the diaphragm area of a relief valve according to another embodiment.

FIG. 6 shows a schematic cross-sectional view of the diaphragm area of a relief valve according to a sixth embodiment. The diaphragm 617 and the radiation shield plate 619 together form the first chamber 623. The radiation shield plate 619 again cooperates with the opposite valve housing wall 606 to form the second chamber 624. A ring-shaped gap 640 is present between the outer periphery 620 of the radiation shield plate 619 and the valve housing 605. The ring-shaped gap 622 between the radiation shield plate 619 and the valve stem 604 of the valve element 602 is also present, around which the radiation shield plate 619 extends. In addition, the radiation shield plate 619 is designed with the web 637, which surrounds the valve stem 604 in ring-like fashion and rests against the valve housing wall 606 opposite the radiation shield plate 619. The air entering the first chamber 623 via the air inlet 629 flows around and cools the diaphragm 617 and the radiation shield plate 619 on one side; some of this air then flows through the ring-shaped gap 640 between the outer periphery 620 of the radiation shield plate 619 and the valve housing 605 and thus into the second chamber 624. The rest of the air flows out of the first chamber 623 via the ring-shaped gap 622 between the radiation shield plate 619 and the valve stem 604 and thus enters the gap 639 between the web 637 and the valve stem 604. The air flowing through the air inlet 629 and into the second chamber 624 cools the surrounding components and then flows through the openings 638 in the web 637 and thus into the gap 639 between the web 637 and the valve stem 604. There this part of the air flow combines with the part flowing out of the first chamber 623 via the ring-shaped gap 622 between the radiation shield plate 619 and the valve stem 604. The combined air flow now flows toward the valve disk 603 through the gap 631 between the valve stem 604 and the valve housing 605. The further course of the air flow is the same as that described in association with FIG. 1.

Figure 7:
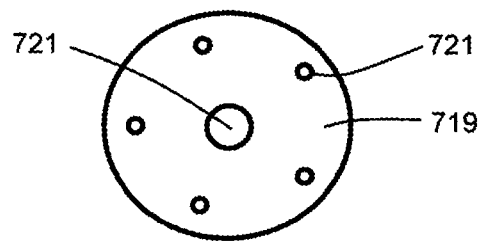
FIG. 7 shows a top view of a radiation shield plate according to another embodiment.

FIG. 7 shows a top view of the radiation shield plate 719 according to another embodiment. In the assembled state of the relief valve (not shown), the valve stem (not shown) projects through the opening 721 in the center. The outer, uniformly distributed openings 721 allow the air to pass through.

Figure 8:
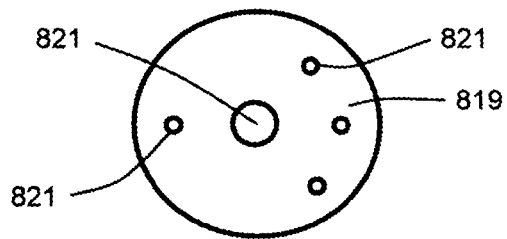
FIG. 8 shows a top view of a radiation shield plate according to another embodiment.

FIG. 8 shows a top view of the radiation shield plate 819 according to another embodiment. In the assembled state of the relief valve (not shown), the valve stem (not shown) projects through the opening 821 in the center. The outer openings 821 allow the air to pass through. As in the figures described above, in the assembled state of the relief valve the air enters the chambers from one side and therefore nonuniformly. To make the air flow through the radiation shield plate 819 more uniformly and thus to improve the cooling of the diaphragm, the total cross-sectional area of the openings 821 arranged on the side facing the air inlet is smaller than that of the openings on the side facing away from the air inlet.

LIST OF REFERENCE NUMBERS 1 relief valve
2, 202, 302, 402, 502, 602 valve element
3, 203, 303, 403, 503, 603 valve disk
4, 204, 304, 404, 504, 604 valve stem
5, 205, 305, 405, 505, 605 valve housing
6, 206, 306, 406, 506, 606 valve housing wall
7 valve seat
8 exhaust gas housing
9 exhaust gas channel
10 relief channel
11 overflow opening
12 spring
13 spring chamber
14 cover 15 holder
16 space
17, 217, 317, 417, 517, 617 diaphragm
18 outer periphery
19, 219, 319, 419, 519, 619, 719, 819 radiation shield plate
20, 220, 320, 420, 520, 620 outer periphery
21, 321, 421, 721, 821 openings
22, 222, 322, 422, 522, 622 ring-shaped gap
23, 223, 323, 423, 523, 623 first chamber
24, 224, 324, 424, 524, 624 second chamber
25 pleat
26 pleat wall
27 ring-shaped groove
28 wall
29, 229, 329, 429, 529, 629 air inlet
30 ring-shaped channel
31, 231, 331, 431, 531, 631 gap
32 hot-side space
33 hot-side radiation shield plate
34 outer periphery
35 ring-shaped gap
36 air outlet
237, 337, 437, 537, 637 web
338, 638 openings
239, 339, 439, 539, 639 gap
640 ring-shaped gap

The invention claimed is:

1. A relief valve for exhaust gas turbochargers, comprising; a valve housing; a valve disk that cooperates with a valve seat; a valve stem guided in the valve housing, the valve stem having an overall length, a first end that extends at most to a midpoint of the overall length of the valve stem and a second end opposite the first end, the valve disk being at the second end of the valve stem, wherein a space is provided in the valve housing; a diaphragm arranged in the space and connected to the valve stem, wherein the diaphragm has an outer periphery connected to the valve housing with a sealing effect; a radiation shield plate located completely in the housing in the space on a side of the diaphragm facing the valve disk and a certain distance away from the diaphragm so as to extend around the first end of the valve stem, wherein the plate divides the space into two chambers, namely, a first chamber bounded by the diaphragm and the radiation shield plate, and a second chamber, bounded by the radiation shield plate and a wall of the valve housing, wherein, in an area of the chambers, the valve housing has an outer periphery with at least one air inlet for supplying air, wherein at least some of the air entering through the air inlet flows through the housing along the valve stem toward the valve disk, wherein the radiation shield plate has at least one opening allowing passage of the air, whereby air flows continuously through the first chamber formed by the diaphragm and the radiation shield plate, and wherein the air leaving the first chamber proceeds via a ring-shaped gap between the valve stem and the radiation shield plate.

2. The relief valve according to claim 1, wherein the first chamber is provided with the air inlet.

3. The relief valve according to claim 1, wherein the first chamber is provided with the air inlet, and at least some of the air flowing out of the first chamber flows into the second chamber.

4. The relief valve according to claim 1, wherein the second chamber is provided with the air inlet, and the air flowing out of the second chamber flows into the first chamber.

5. The relief valve according to claim 4, wherein the air inlet opens out into a ring-shaped channel in the valve housing, which channel is open to the second chamber.

6. The relief valve according to claim 1, wherein the first chamber and the second chamber have the air inlet in common, and air flows continuously at least through the first chamber.

7. The relief valve according to claim 1, wherein the radiation shield plate has an outer periphery connected with a sealing effect to the valve housing.

8. The relief valve according to claim 1, wherein a ring-shaped gap is present between an outer periphery of the radiation shield plate and the valve housing.

9. The relief valve according to claim 1, wherein several openings, which are distributed uniformly on a radius, are provided in the radiation shield plate.

10. The relief valve according to claim 1, wherein several openings are provided in the radiation shield plate, the openings, to make air flow uniform, being arranged so that a cross-sectional area of the openings on a side facing the air inlet is smaller than a cross-sectional area of the openings on a side facing away from the air inlet.

11. The relief valve according to claim 9, wherein the openings in the radiation shield plate are all of equal size.

12. The relief valve according to claim 9, wherein the openings in the radiation shield plate are of different sizes.

13. The relief valve according to claim 10, wherein the openings in the radiation shield plate are of different sizes.

14. The relief valve according to claim 9, wherein the openings are arranged near an outer periphery of the radiation shield plate.

15. The relief valve according to claim 1, wherein the radiation shield plate has a web that points toward the valve disk and rests against an opposite valve housing wall.

16. The relief valve according to claim 15, wherein the web is formed as a pleat that extends around the valve stem in ring-like fashion and projects into and rests against a ring-shaped groove in the valve housing.

17. The relief valve according to claim 15, wherein the web has a periphery with at least one opening.

18. The relief valve according to claim 15, wherein the web has several openings uniformly distributed around a periphery of the web.

19. The relief valve according to claim 15, wherein the web has a periphery with several openings that are at different distances from each other.

20. The relief valve according to claim 17, wherein the openings in the web are all of equal size.

21. The relief valve according to claim 17, wherein the openings in the web are of different sizes.

22. The relief valve according to claim 1, wherein air leaving a gap between the housing and the valve stem flows into a hot-side space, which is bounded by a downstream valve housing wall and a hot-side radiation shield plate extending around the valve stem, wherein the hot-side radiation shield plate has an outer periphery connected with a sealing effect to the valve housing wall, wherein the hot-side radiation shield plate has air outlets in an area of the outer periphery of the hot-side radiation shield plate.

23. The relief valve according to claim 22, wherein a ring-shaped gap, which represents another air outlet, is formed between the hot-side radiation shield plate and the valve stem.

* * * * *